B. S. SUMMERS.
FLAX THRESHING MACHINE.
APPLICATION FILED AUG. 16, 1915.

1,327,297.

Patented Jan. 6, 1920.
5 SHEETS—SHEET 3.

Witnesses
Martin H. Olsen
Fidelis Maichen

Inventor
Bertrand S. Summers
By Rector Hibben Davis Macauley
His Attys

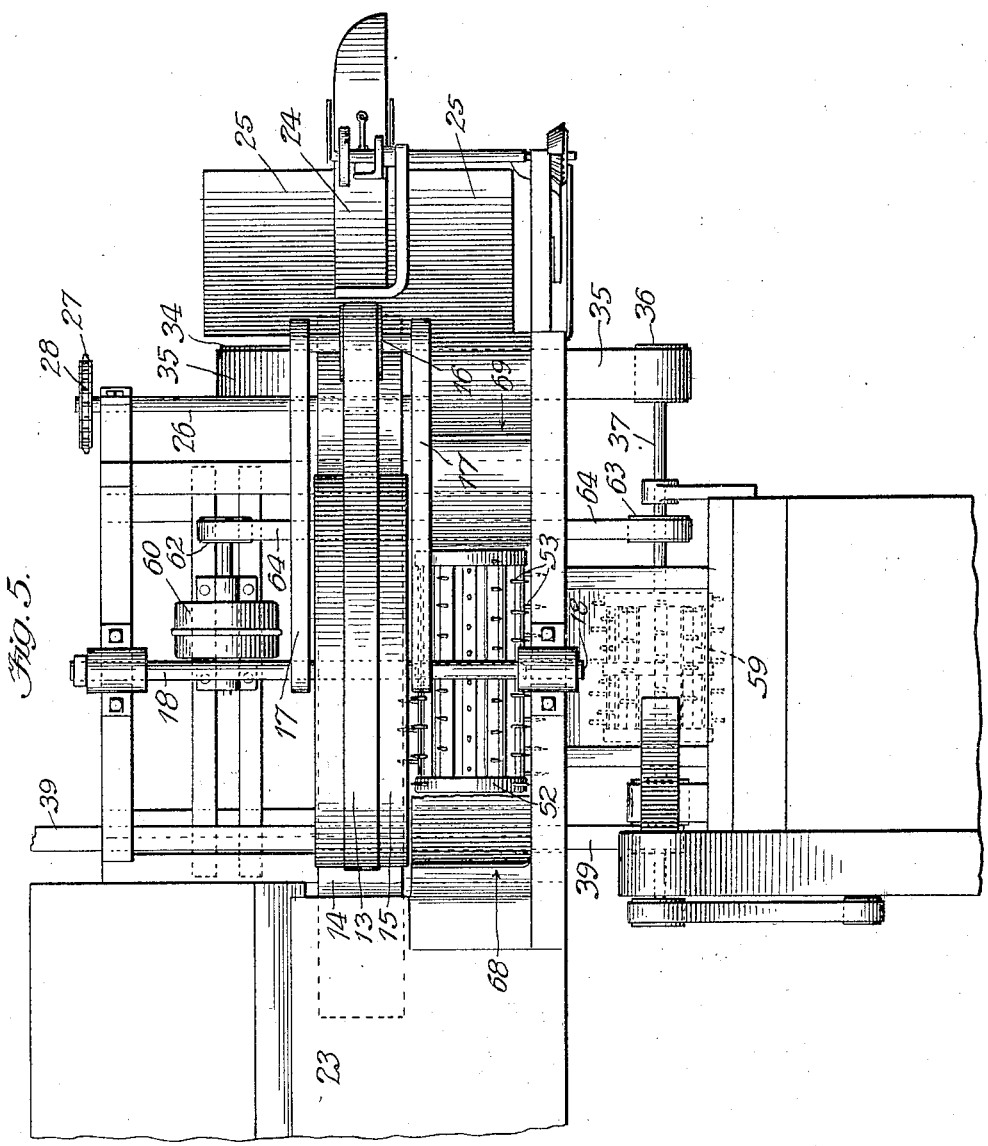

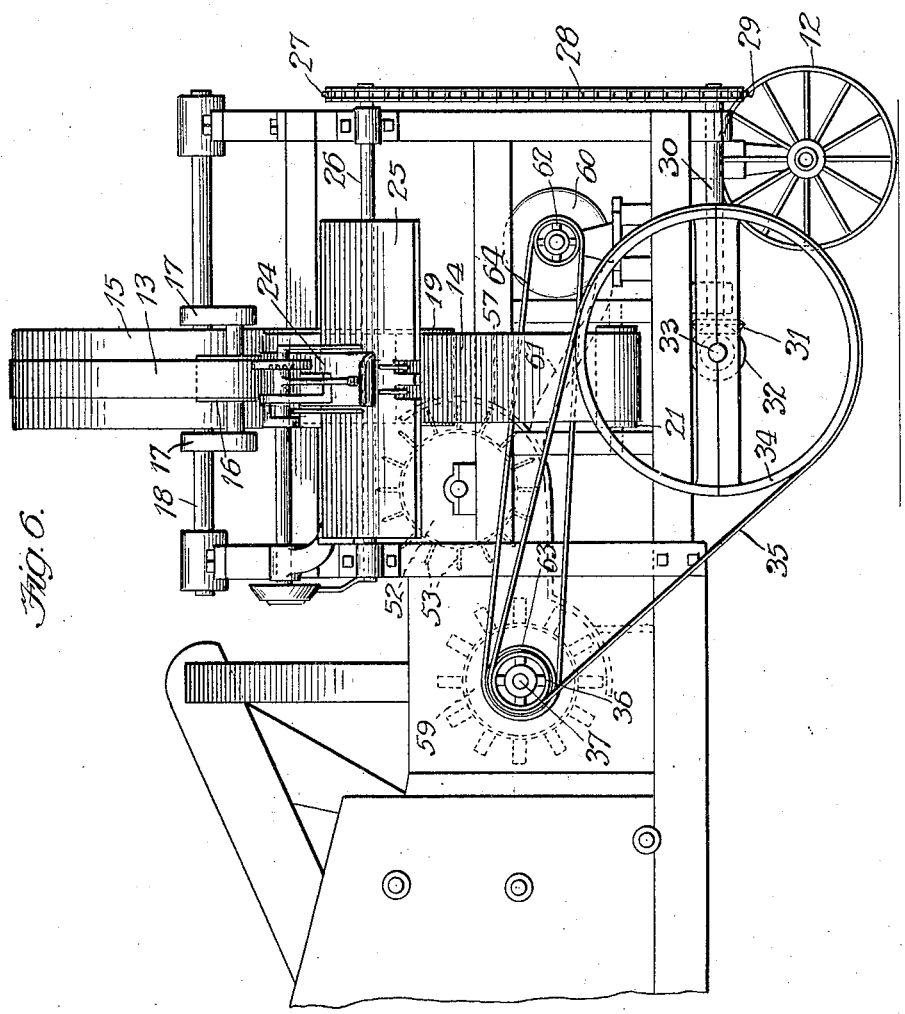

UNITED STATES PATENT OFFICE.

BERTRAND S. SUMMERS, OF PORT HURON, MICHIGAN.

FLAX-THRESHING MACHINE.

1,327,297.  Specification of Letters Patent.  Patented Jan. 6, 1920.

Application filed August 16, 1915. Serial No. 45,614.

*To all whom it may concern:*

Be it known that I, BERTRAND S. SUMMERS, a citizen of the United States, residing at Port Huron, county of St. Clair, and State of Michigan, have invented certain new and useful Improvements in Flax-Threshing Machines, of which the following is a specification.

My invention relates to a machine of this character in which the flax plants in the condition in which they are harvested are fed to a stripper by which the seed, chaff, etc., are stripped from the plants and then to a binder by which the plants are bound into bundles, the seed, etc., being passed on to a separator by which the chaff, dirt, etc., are separated therefrom.

Figure 1:
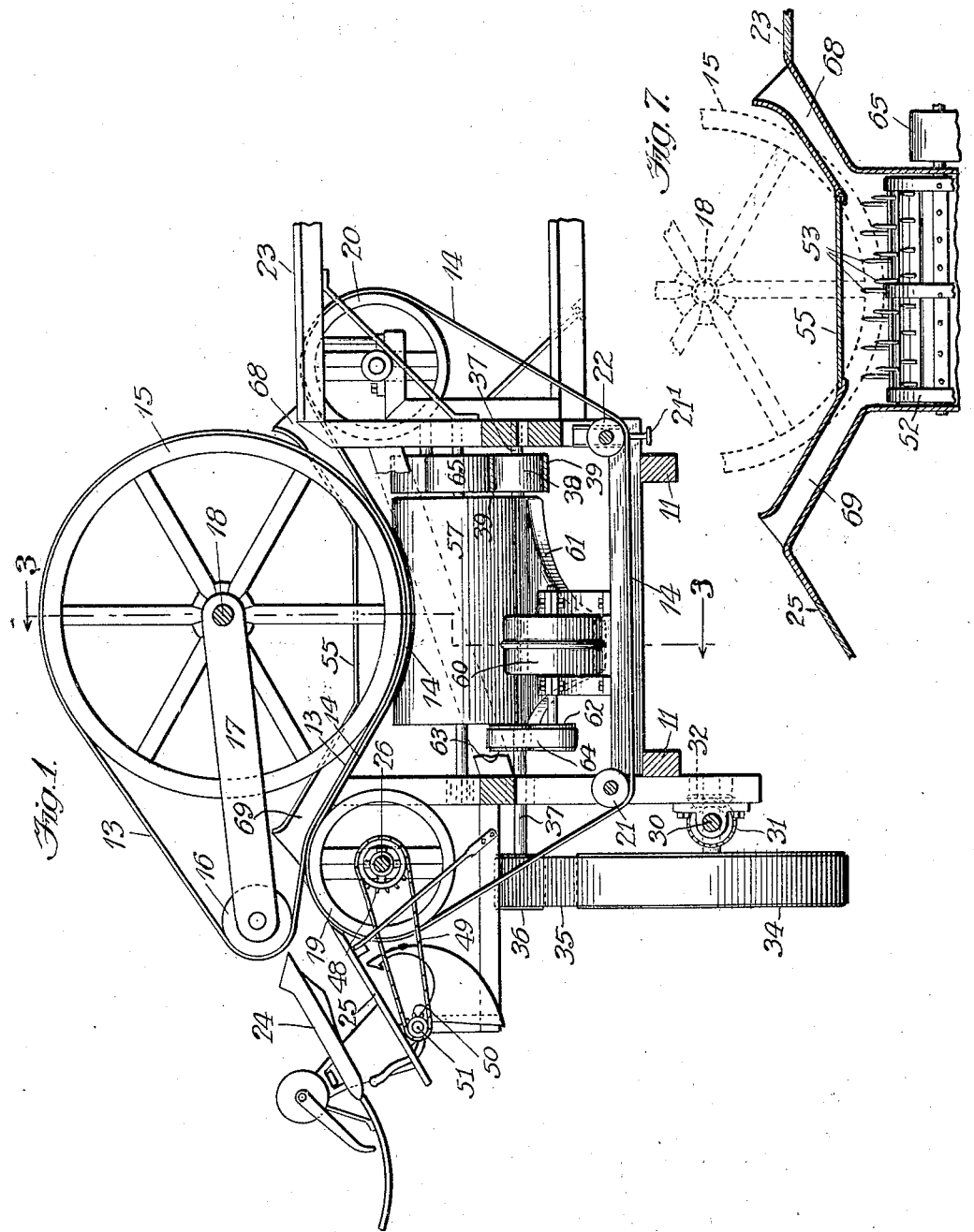
Figure 2:
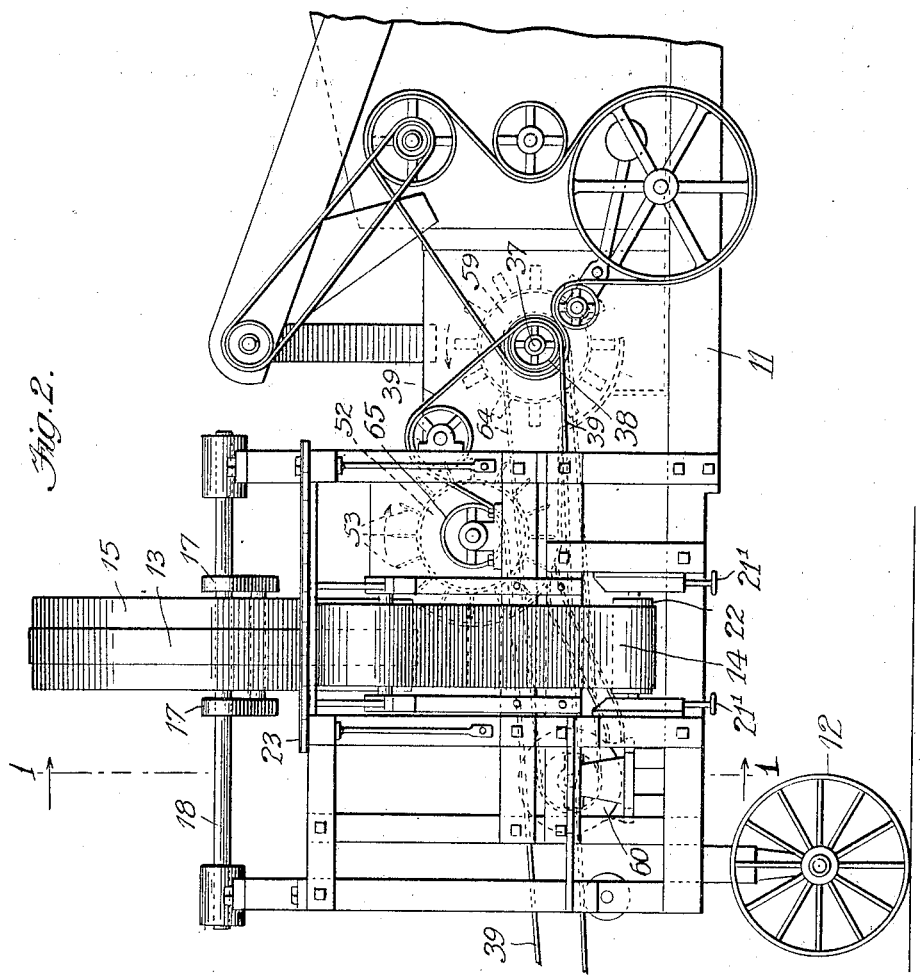
Figure 3:
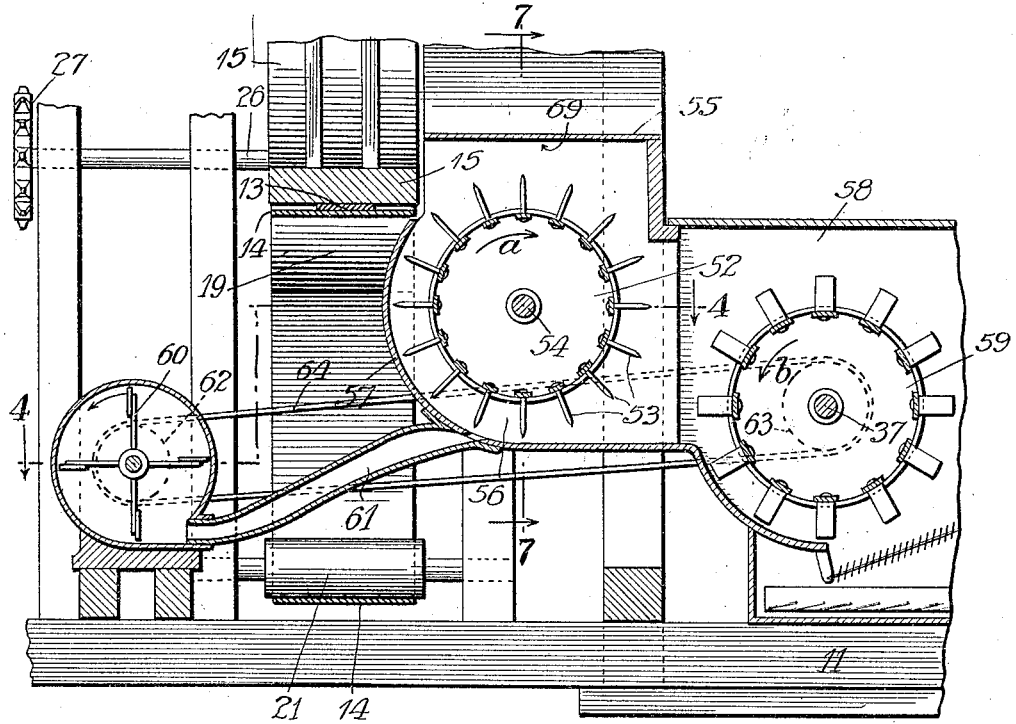
Figure 4:
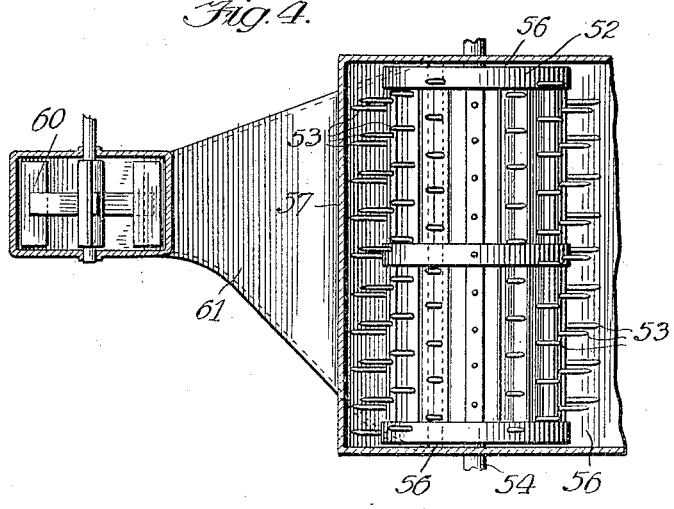

Referring to the accompanying drawings, Figure 1 is a transverse vertical section through my improved machine on the line 1—1 of Fig. 2 looking in the direction of the arrows; Fig. 2 is a side elevation of so much of the same as is necessary to an understanding of my invention; Fig. 3 a section on a vertical plane at right angles to Fig. 1 and on line 3—3 thereof; Fig. 4 is a horizontal section on the broken line 4—4 of Fig. 3, parts being shown in elevation; Fig. 5 a plan with parts broken away to better show the construction; Fig. 6 an elevation of the side of the machine opposite Fig. 2; and Fig. 7 a section on the line 7—7 of Fig. 3.

As shown in Fig. 2, the machine comprises a frame 11 of any suitable character mounted as usual upon ground wheels 12 and supporting a stripping and separating mechanism. The latter comprises a pair of belts to which the flax plants are fed in such a position that the belts grasp the stalk or root ends of the plants firmly with the seed ends free, a stripping mechanism to which the free ends of the flax plants are fed by the belts and which removes the seed, etc., from the plants, a binder to which the straw is delivered after it has been stripped and by which it is tied into bundles, and a separator for the seed and chaff.

The belts by which the flax plants are carried through the machine are numbered 13, 14, respectively in the drawings, the upper or clamping belt 13 running upon a large belt wheel 15 and an idler pulley 16, said pulley being maintained the required distance from the wheel by a pair of radius arms 17 pivoted upon the shaft 18 of the belt wheel. The belt 13 and the pulley and wheel upon which it is mounted are frictionally driven from the lower or carrier belt 14 as will presently appear. The belt 14 is mounted upon rollers 19, 20, and pulleys 21, 22, arranged in the vertical plane of and below the belt 13, the tops of the rollers 19 and 20 being suitably located above the lower edge of the wheel 15 and on opposite sides of said wheel so that the belt 14 is depressed intermediate said rollers by said wheels. The pulley 21 is a mere idler pulley and the pulley 22 is similar thereto except in that it is mounted in adjustable bearings by means of which the tension upon the belt 14 may be adjusted by screw 21'. A feed table 23 is provided at the right (as shown in Fig. 1) from which the flax plants are fed by hand or otherwise into the grasp of the belts 13, 14, and at the other side of the machine a binder 24, which may be of any usual or approved design, receives the straw directly from the belts and binds the same into bundles of suitable size, the lower wall 25 of the binder being adjusted close to the lower belt so as to receive all plants fed by the latter. The lower belt 14 is driven from the roller 19 which latter is mounted on shaft 26 suitably journaled in the frame and carrying, besides the roller 19, a sprocket wheel 27 by which said shaft and roller are rotated. Sprocket 27 receives a sprocket chain 28 which also embraces the sprocket 29 upon a countershaft 30, and upon the latter is also mounted a bevel gear 31 meshing with a similar gear 32 upon stub shaft 33 which carries the large belt pulley 34. Belt 35 upon said pulley is driven by a small pulley 36 upon cross shaft 37 of the separator drum, which receives its motion through a pulley 38 on the opposite end thereof, and belt 39 from the tractor engine (see Fig. 6). As the separator is old and common, *per se*, as above stated, it is unnecessary to further explain this part of the construction.

From what has been said of the drive connections it is apparent that the rotation of the separator drum, through the shaft 37, belt 35, pulley 34, shaft 33, pinions 32, 31, shaft 30, sprocket 29, sprocket chain 28, sprocket 27, shaft 26 and roller 19, drives the belt 14, and the latter frictionally drives the upper belt 13 and the wheel and pulley upon which the latter is mounted. The binder may be of any usual or suitable type and may be driven in any suitable manner as, for example, from the shaft 26 which for this purpose is provided with a sprocket 48 driving a chain 49 which passes over a sprocket 50 upon the operating shaft 51 of the binder.

As heretofore explained the belts grip the flax between them, the upper belt 13 being narrower than the lower belt 14 (see Fig. 3), and carry them past the stripper mechanism with the free ends extending from between said belts.

The form of stripper mechanism which I employ is best shown in Fig. 3 and consists of an elongated cylindrical drum 52 which may be hollow and is provided about its periphery with projecting spikes or pins 53 which strip and beat off the seed, chaff, etc., from the flax plants. The drum 52 is mounted upon a shaft 54 which extends perpendicular to, below and at one side of the shaft of belt wheel 15 and said stripper drum is driven in the direction of the arrow $a$ (Fig. 3) the pins thereof penetrating the flax plants and stripping them. As seen in Figs. 1 and 7 the belts aided by the guide passages 68, 69 carry the plants in a curved path gradually downward toward the drum and then upwardly therefrom so that the plants at first are but slightly entered by the pins on the drum which only penetrate to the maximum depth at the longitudinal center of the drum. The stripper drum is inclosed in a chamber comprising the upper wall 55, end walls 56, 56, in which the shaft is journaled and curved rear wall 57 and communicating through a suitable opening with the separator chamber 58 in which the separator drum 59 is mounted in a suitable or well-known manner. Said separator drum is driven in a direction opposite to that in which the drum 52 rotates (see the arrow $b$ in Fig. 3) and receives the seed, chaff, etc., from the stripper and separates it in a manner common to devices of this character. In order to avoid the accumulation of material around or beneath the stripper drum 52 I provide a fan 60 of any suitable design which communicates by a flared passage 61 with the bottom of the chamber in which the stripper drum is mounted so that a current of air may be driven into said chamber to drive the seed, chaff, etc., into the separator chamber. The shaft of the fan carries a pulley 62 which is connected for driving the fan with a pulley 63 on the shaft of the separator by a belt 64.

The stripper drum may be driven in any desired manner but in a direction contrary to that of the separator, as for example, by the driving belt 39 engaging pulley 65 on the shaft thereof.

The flax plants are fed continuously across the machine being preferably placed upon the carrier belt by hand with their upper or seed bearing ends projecting toward the rear of the machine and in a direction to be engaged by the stripper. The stalk or root ends of the plants are then engaged by the clamping belt and securely held thereby while being carried past the stripper. The pins on the latter engage the plants penetrating gradually more deeply until the latter are substantially opposite the longitudinal center of the drum after which the plants are gradually withdrawn and fed to the binder. The seeds, chaff, etc., are in the meantime carried over the stripper drum and mostly fed directly to the separator. Any material, however, which tends to settle at the bottom of the stripper is blown over into the separator, which operates in the usual manner to separate the chaff, etc.

I claim:

1. In a machine of the class described, a drum provided on its periphery with means for beating off the seed, etc., from flax plants and the like, means for rotating the drum, means for carrying plants to be stripped longitudinally of the drum comprising a pair of endless belts, a pair of rollers respectively at opposite ends of the drum to receive and drive one of said belts, means for receiving the other of said belts comprising a wheel intermediate the rollers which support the first named belt and beneath which both belts travel, said wheel being so located between the rollers as to cause the plants carried by the belts to first descend gradually to be more and more engaged by the drum and then ascend slowly therefrom.

2. In a device of the class described a horizontal drum provided with stripping mechanism on the periphery thereof means for rotating the drum, a single pair of rollers at opposite ends of the drum, an endless belt passing about said rollers, the upper run thereof being unsupported intermediate said rollers, a second belt, means for supporting the second belt above and partially in contact with the first said belt, said means comprising a wheel of a diameter greater than the effective length of the drum, said wheel serving to depress the belts intermediate the length of the drum whereby plants carried by the belts are caused to be lowered gradually toward and raised gradually from the drum as they travel along the length thereof.

3. In a machine of the class described, a cylindrical stripping drum, means for feeding plants longitudinally thereof and lowering them toward the periphery of the drum.

4. In a machine of the class described, a cylindrical stripping drum, means for feeding plants longitudinally thereof and gradually lowering them toward and causing them to recede from the periphery of the drum.

5. In a machine of the class described, means for carrying plants into engagement with said stripping means comprising an upper and a lower belt, a pair of rollers upon which the lower belt is mounted, means for driving one of said rollers, an idler belt wheel between and partially above said rollers, a pulley, radius arms upon which said pulley is carried, the upper belt being mounted upon said wheel and pulley and stripping mechanism arranged substantially tangential of the idler belt wheel to operate longitudinally of the plants.

6. In a machine of the class described, a horizontal cylindrical stripping drum, means for carrying plants to be stripped longitudinally of said drum and gradually lowering them toward the periphery thereof.

7. In a machine of the class described, a horizontal cylindrical stripping drum, an endless belt moving through a portion of its course downwardly toward and longitudinally of said drum a body moving and coöperating therewith for gripping the plants transversely and moving them longitudinally of the drum.

8. In a machine of the class described, a horizontal stripping drum, an endless belt moving during a portion of its course downwardly toward and longitudinally of the drum and a wheel coöperating with the belt for gripping plants transversely between said wheel and belt and presenting them for treatment by the stripping drum.

9. In a machine of the class described, a horizontal cylindrical stripping drum, a pair of endless belts adapted to engage flax between them and moving for a portion of their path downwardly toward longitudinally of and adjacent the drum and adapted to carry plants into engagement therewith.

10. In a machine of the class described, a horizontal drum, a pair of belts moving for a portion of their paths in contact with each other downwardly toward longitudinally of and adjacent said drum, one of said belts being positively driven and the other driven therefrom.

11. In a machine of the class described, a horizontal stripping drum, a pair of belts mounted to one side of said drum and adapted to grip and carry plants into engagement therewith, means for causing said belts to gradually descend during the first portion of their feeding movement toward the horizontal plane of the axis of the drum whereby the plants are caused to gradually approach the periphery of the drum.

12. In a machine of the class described, a horizontal cylindrical stripping drum, a wheel mounted substantially above and to one side of said stripping drum, a belt coöperating with said wheel to grip and carry plants past said drum and a pair of pulleys located respectively on opposite sides of the wheel, and extending above the lowest point thereof and carrying said belt whereby the latter is deflected downwardly by said wheel.

13. In a machine of the class described, a horizontal cylindrical stripping drum, an upper and a lower belt mounted in the same vertical plane to one side of said drum, a belt wheel about which one of said belts runs a pair of belt pulleys arranged upon opposite sides of said wheel respectively and extending above the lowermost point thereof and carrying the lower belt whereby the last said belt is deflected downwardly by said wheel.

14. In a machine of the class described, a horizontal cylindrical stripping-drum, a pair of belts mounted for movement in a vertical plane and adjacent said drum and longitudinally thereof and adapted to grip plants between them and carry them past the stripping-drum, a belt wheel about which one of said belts extends, and a pair of belt rollers mounted upon opposite sides of said wheel about which the other of said belts extends.

BERTRAND S. SUMMERS.

Witnesses:
Gus Hill,
Alex. Adams.